July 10, 1928.
E. R. TURNER
1,676,623
MULTIPLE LOCK
Filed April 2, 1926
2 Sheets-Sheet 1
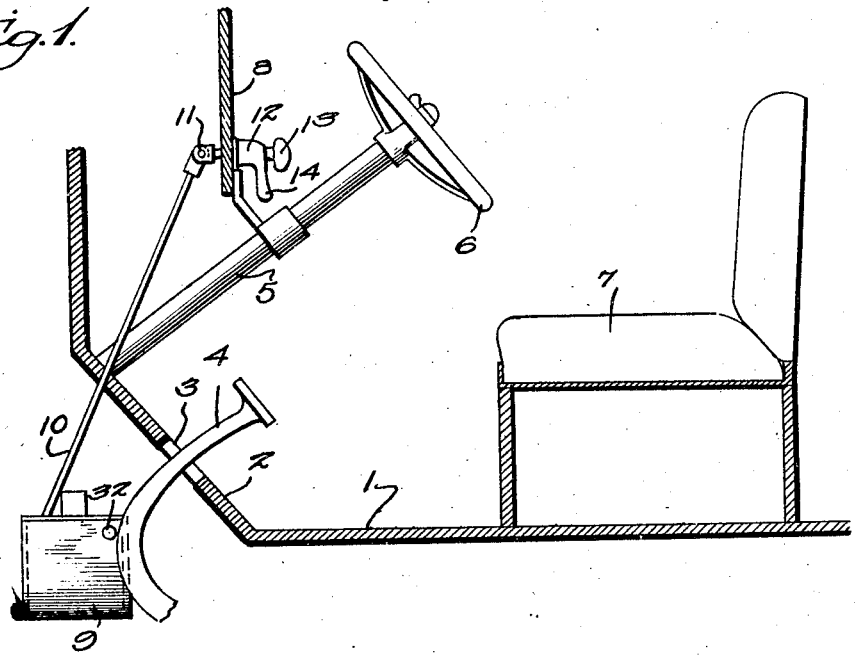
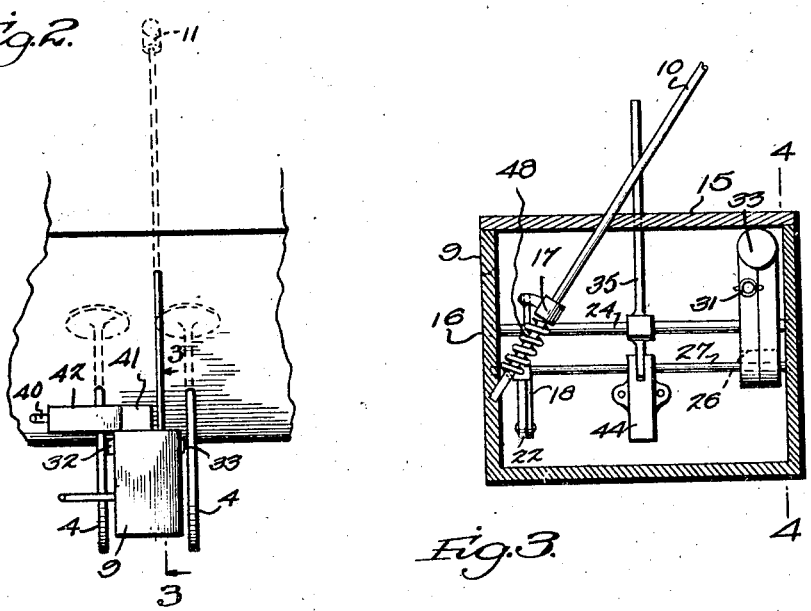
Inventor
ERVEN R. TURNER
By John W. Farley
Attorney July 10, 1928.
E. R. TURNER
1,676,623
MULTIPLE LOCK
Filed April 2, 1926   2 Sheets-Sheet 2
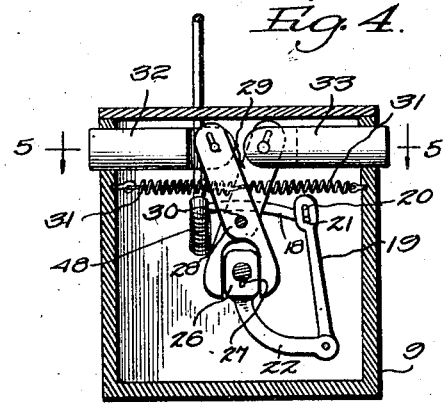
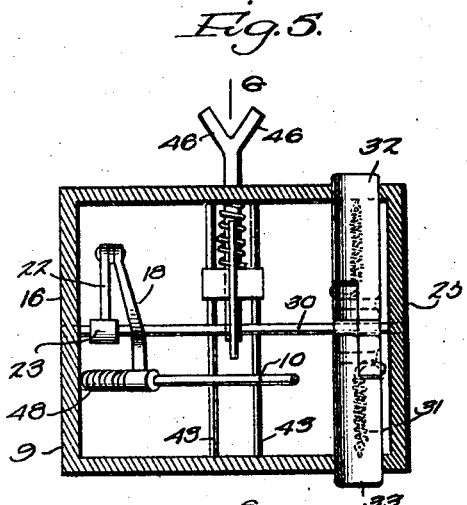
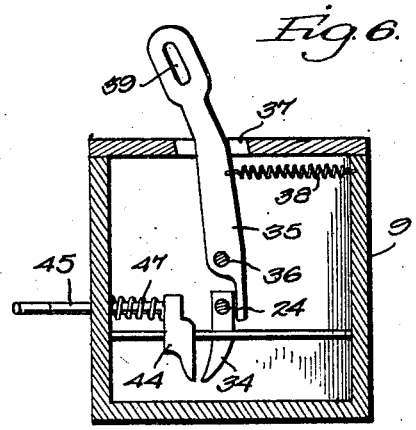
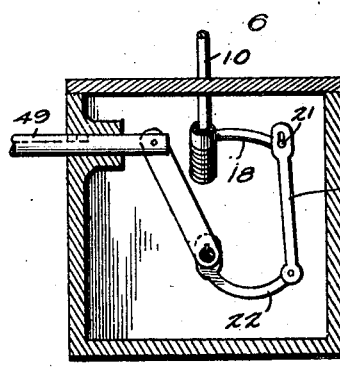
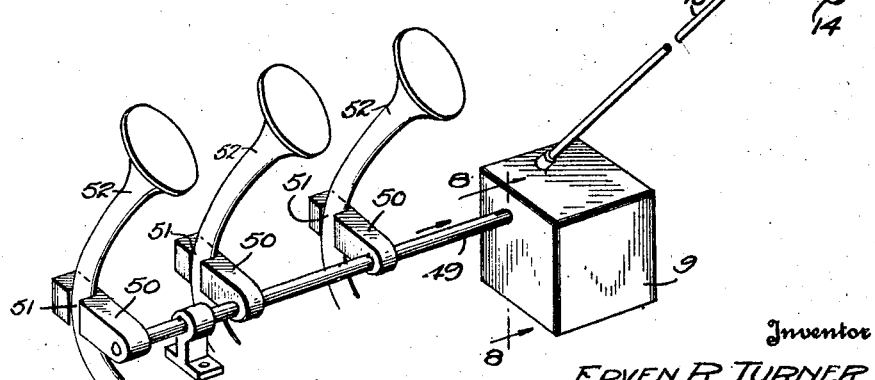
Inventor
ERVEN R. TURNER
By John W. Farley
Attorney Patented July 10, 1928.

1,676,623

UNITED STATES PATENT OFFICE.

ERVEN R. TURNER, OF MEMPHIS, TENNESSEE, ASSIGNOR TO CLINTON BURL GRANT, OF MEMPHIS, TENNESSEE.

MULTIPLE LOCK.

Application filed April 2, 1926. Serial No. 99,421.

This invention relates to multiple locks and more particularly to means for locking various parts of the control mechanism of a motor vehicle against unauthorized use.

An object of the invention is to provide locking means actuated by a key controlled lever arranged on the dash of the vehicle.

A further object is to provide means whereby severing of the external operating lever will cause the locking mechanism to assume an operative position.

A still further object is to provide a device of this character that may be adapted, by slight alterations, to different types of motor vehicles having different arrangements of the control pedals and levers.

In the accompanying drawings I have shown several embodiments of the invention. In this showing,—

Figure 1 is a vertical longitudinal sectional view of a portion of the motor vehicle showing the invention applied and showing the invention in side elevation, Figure 2 is a front elevation of the locking means in position on the vehicle, Figure 3 is a vertical longitudinal sectional view on line 3—3 of Figure 2, Figure 4 is a vertical transverse sectional view on line 4—4 of Figure 3, Figure 5 is a horizontal sectional view on line 5—5 of Figure 4, Figure 6 is a transverse vertical sectional view on line 6—6 of Figure 5, Figure 7 is a perspective view of another form of the invention applied to a vehicle having three control pedals for the transmission gearing and brake, and Figure 8 is a vertical transverse sectional view on line 8—8 of Figure 7.

Referring to Figures 1 to 6 of the drawings, the reference numeral 1 designates the floor board of a motor vehicle which is provided with the usual inclined portion 2 having slots 3 formed therein for the reception of the usual clutch and brake pedals 4. The vehicle is provided with the usual steering post column 5 and steering wheel 6. A driver's seat 7 is arranged adjacent the steering wheel and a dash-board 8 is arranged in front of the steering wheel. The parts heretofore described are of the usual construction and form no part of the invention except in the combination claimed.

The device forming the subject matter of the present invention is adapted to be arranged in a casing 9 beneath the floor board of the vehicle and preferably arranged between the clutch and brake pedals (see Figure 2). An operating rod 10 projects from the top of the casing through the floor board and extends upwardly in back of the dash or instrument board. As shown, this lever is provided with a universal joint 11 and the free end of the lever extends through the dash-board. Suitable locking means 12 is arranged on this lever and is adapted to be key actuated as indicated at 13. The lock is provided with a suitable operating handle 14. As shown (see Figure 3) the operating lever 10 is journaled in the top 15 and front wall 16 of the casing. Intermediate its bearings it is provided with a sleeve 17 which is adapted to revolve with the lever and this sleeve is provided with an arm 18 which is connected to a link 19. As shown, the link is provided with a slot 20 at one end adapted to receive a pin 21 carried by the arm 18. The other end of the link is connected to an arm or crank 22 which is carried by a sleeve 23 mounted on a shaft 24 which extends longitudinally of the casing and is journaled in the front wall 16 and the rear wall 25.

Adjacent the rear of the casing the shaft is provided with a block or spreading member 26 which is keyed thereto as indicated at 27. This block is mounted between the lower ends of a pair of arms 28 and 29. These arms are pivotally mounted on a pin 30 secured in the rear wall 25 of the casing and are normally retained in their inner inoperative position shown in Figures 4 and 5 of the drawings by means of springs 31. The upper ends of the arms are connected to plungers 32 and 33 respectively which extend through the side walls of the casing, as shown.

At a point intermediate the front and rear of the casing the operating shaft 24 is provided with a lug or arm 34. A lever 35 is pivotally mounted on a pin 36 arranged over the operating shaft (see Figure 6) and the upper end of this lever extends through a slot 37 in the top of the casing. The lever is normally retained in the inactive position shown in Figure 6 of the drawings by means of a spring 38. The upper end of this lever is slotted as at 39 and is adapted to be connected to a rod or lever 40 (see Figure 2), which extends from the locking casing and is adapted to lock the starter or starter switch in any suitable manner. An auxiliary casing 41, (see Figure 2) may be arranged over the connection between the lever 35 and the rod 40 and the end of the rod 40 may be arranged in a tubular extension 42 of this casing.

A pair of guide rods 43 are arranged transversely of the locking casing adjacent the lug or operating member 34. A cross head 44 is mounted on these guide rods and this cross head carries a rod 45 which projects through the side wall of the casing and is forked as at 46. The forked ends of this rod are adapted to be connected to the spark and throttle control levers (not shown) in any suitable manner. As shown, a spring 47 is arranged around the rod 45 between the side wall of the casing and the cross head 44 to normally retain it in inoperative position. Suitable means may be provided to cause the locking mechanism to automatically assume an operative position if the operating lever 10 is severed externally of the casing. As shown, a spring 48 may be arranged around this lever within the casing and connected to the side wall and the lever in such manner that it is retained under tension when the mechanism is in an inoperative position and would move the mechanism to an operative position if movement of the lower portion of the operating lever were not restrained.

In the form of the invention shown in Figures 7 and 8 of the drawings, I have provided a locking means for a vehicle having a planetary transmission wherein three foot pedals are used for controlling the transmission and brake. In these figures, for the sake of simplicity, I have not illustrated the starter mechanism or the spark and throttle lever locking mechanism. In place of one of the plungers 32 and 33, I provide an extended rod 49 having a plurality of arms 50 mounted thereon. These rods are provided with recessed portions 51 and are adapted to receive the shanks 52 of the pedals as shown in Figure 7 of the drawings, when in an operative position.

The operation of the device will be apparent from the foregoing description. The parts are normally in the position shown in Figures 4 to 6 of the drawings. To lock the various control pedals and levers the proper key 13 is inserted in the lock 12 on the dash and the handle 14 given a quarter of a turn to actuate the rod 10. This actuates the locking shaft 24 which spreads the lower ends of the arms 28 and 29 causing them to turn on their pivot 30 and forcing the plungers 32 and 33 outwardly. These plungers engage the clutch and brake pedals 4 to prevent actuation of either of the pedals. Likewise, the arm or lug 34 is rotated through a quarter of a circle swinging the arm 35 on its pivot to lock the starter and at the same time moving the cross head 44 on the guide rods 43 to project the rod 45 and lock the spark and throttle levers.

In the form of the invention shown in Figures 7 and 8 of the drawings the operation is essentially the same except that the movement of the rod 49 by one of the arms 28 or 29 locks the three pedals of a vehicle provided with a planetary transmission. After the operating handle 14 has been turned a quarter of a revolution the key is again turned to lock the operating lever 10 in operative position before the key is removed. When the car is unlocked the key is likewise turned after the operating lever 10 has been moved to inoperative position which will prevent the locking mechanism from assuming an operative position without unlocking the mechanism on the dash board.

It is to be understood that the forms of the invention herewith shown and described are to be taken as preferred examples of the same and that various changes in the shape, size, and arrangement of parts may be resorted to without departing from the spirit of the invention or the scope of the subjoined claims.

I claim:

1. In a device of the character described, a casing, an operating rod extending into said casing, an operating shaft mounted in said casing and operatively connected to said rod, a spreader member mounted on said shaft, a pivoted arm arranged adjacent said member and adapted to be actuated thereby, and a plunger connected to said arm and adapted to be projected thereby.

2. In a device of the character described, a casing, an operating rod extending into said casing, an operating shaft mounted in said casing and operatively connected to said rod, a pivoted arm mounted in said casing and operatively connected to said shaft to be actuated thereby, and a plunger connected to said arm and adapted to be projected by the actuation of said arm.

3. In a device of the character described, a casing, an operating rod extending into the casing, an operating shaft mounted in said casing and operatively connected to said rod, a lug mounted on said shaft, and a pivoted rod arranged in said casing and disposed in the path of said lug.

4. In a device of the character described, a casing, an operating rod extending into the casing, an operating shaft mounted in said casing and operatively connected to said rod, a lug mounted on said shaft, a pivoted rod arranged in said casing and disposed in the path of said lug, and a slidably mounted rod projecting from said casing and adapted to be actuated by said lug.

5. A device constructed in accordance with claim 4 wherein said slidably mounted rod is provided with a cross head on its inner end adapted to be engaged by said lug.

6. In a device of the character described, a casing, an operating rod extending into said casing, an operating shaft mounted in said casing and operatively connected to said rod, a plunger arranged in said casing and adapted to be projected by the actuation of said shaft, a lug carried by said shaft, and a pivoted lever arranged in the path of said lug.

7. In a device of the character described, a casing, an operating rod extending into said casing, an operating shaft mounted in said casing and operatively connected to said rod, a plunger arranged in said casing and adapted to be projected by the actuation of said shaft, a lug carried by said shaft, a pivoted lever arranged in the path of said lug, and a slidably mounted rod projecting from said casing and adapted to be actuated by said lug.

In testimony whereof I affix my signature.

ERVEN R. TURNER.